(12) United States Patent
Hanyu (10) Patent No.: US 7,978,435 B2
(45) Date of Patent: Jul. 12, 2011

(54) MAGNETIC HEAD SLIDER HAVING MULTIPLE STEP PORTIONS

(75) Inventor: Mitsunobu Hanyu, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 877 days.

(21) Appl. No.: 11/949,389

(22) Filed: Dec. 3, 2007

(65) Prior Publication Data

US 2008/0144221 A1   Jun. 19, 2008

(30) Foreign Application Priority Data

Dec. 13, 2006   (JP) ................................. 2006-336093

(51) Int. Cl.
   *G11B 5/60* (2006.01)
(52) U.S. Cl. ..................................... 360/235.6; 360/236
(58) Field of Classification Search ............... 360/235.6, 360/235.8, 236, 236.3
   See application file for complete search history.

(56) References Cited

U.S. PATENT DOCUMENTS

| | | | |
|---|---|---|---|
| 6,809,904 B2 * | 10/2004 | Boutaghou et al. | 360/235.8 |
| 6,920,015 B2 * | 7/2005 | Mundt et al. | 360/235.6 |
| 6,989,966 B2 * | 1/2006 | Rajakumar | 360/235.6 |
| 7,099,114 B2 * | 8/2006 | Kang | 360/235.6 |
| 7,643,251 B1 * | 1/2010 | Zhang et al. | 360/235.6 |
| 7,760,468 B2 * | 7/2010 | Cha et al. | 360/235.6 |
| 2002/0008940 A1 * | 1/2002 | Jang et al. | 360/236.3 |
| 2005/0105216 A1 | 5/2005 | Ueno et al. | |

FOREIGN PATENT DOCUMENTS

| | | |
|---|---|---|
| JP | 09-231540 | 9/1997 |
| JP | 2001-283549 | 10/2001 |
| JP | 2001-312811 | 11/2001 |
| JP | 2008-171536 | 7/2008 |
| WO | WO 2005/008635 | 1/2005 |

OTHER PUBLICATIONS

Japanese Office Action dated Mar. 22, 2011.

* cited by examiner

*Primary Examiner* — Jefferson Evans
(74) *Attorney, Agent, or Firm* — Pillsbury Winthrop Shaw Pittman, LLP (57) ABSTRACT

According to one embodiment, a head of a disk device has a slider and a head portion disposed on the slider. The slider has a facing surface opposed to a surface of a rotatable recording medium and is flown by an airflow. The facing surface of the slider has a first direction extending in a direction of the airflow and a second direction perpendicular to the first direction. The slider includes a negative-pressure cavity, a leading step portion, a leading pad which protrudes from the leading step portion, a recess which is formed in that part of the leading step portion which is situated on an upstream side of the leading pad with respect to the airflow and defines a first step portion and a second step portion which individually extend in a direction across the first direction and are spaced in the first direction, and a trailing step portion.

9 Claims, 8 Drawing Sheets

Slider of comparative example

Negative pressure distribution
of comparative example
(at inner peripheral portion of disk)

FIG. 10A

Negative pressure distribution
of embodiment
(at inner peripheral portion of disk)

FIG. 10B

Negative pressure distribution
of comparative example
(at outer peripheral portion of disk)

FIG. 11A

Negative pressure distribution
of embodiment
(at outer peripheral portion of disk)

FIG. 11B

Positive pressure distribution
of comparative example
(at inner peripheral portion of disk)

FIG. 12A

Positive pressure distribution
of embodiment
(at inner peripheral portion of disk)

FIG. 12B

Positive pressure distribution
of comparative example
(at outer peripheral portion of disk)

FIG. 13A

Positive pressure distribution
of embodiment
(at outer peripheral portion of disk)

FIG. 13B

FIG. 14C C Large recess area

FIG. 14B B Medium recess area

FIG. 14E E Three recesses

FIG. 14A A Small recess area

FIG. 14D D Two recesses

MAGNETIC HEAD SLIDER HAVING MULTIPLE STEP PORTIONS

CROSS-REFERENCE TO RELATED APPLICATIONS

This application is based upon and claims the benefit of priority from Japanese Patent Application No. 2006-336093, filed Dec. 13, 2006, the entire contents of which are incorporated herein by reference.

BACKGROUND

1. Field

An embodiment of this invention relates to a head used in a disk device such as a magnetic disk device, a head suspension assembly provided with the head, and a disk device provided with the head suspension assembly.

2. Description of the Related Art

A disk device, e.g., a magnetic disk device, includes a magnetic disk, spindle motor, magnetic head, and carriage assembly. The magnetic disk is disposed in a case. The spindle motor supports and rotates the disk. The magnetic head writes and reads information to and from the disk. The carriage assembly supports the magnetic head for movement with respect to the magnetic disk. The carriage assembly includes a rockably supported arm and a suspension extending from the arm. The magnetic head is supported on an extended end of the suspension. The head includes a slider attached to the suspension and a head portion on the slider. The head portion is constructed including a reproducing element for reading and a recording element for writing.

The slider has a facing surface that is opposed to a recording surface of the magnetic disk. A predetermined head load directed to a magnetic recording layer of the disk is applied to the slider by the suspension. When the magnetic disk device operates, an airflow is generated between the disk in rotation and the slider. Based on the principle of aerodynamic lubrication, a force (positive pressure) to fly the slider above the recording surface of the disk acts on the facing surface of the slider. By balancing this flying force with the head load, the slider is flown with a given gap above the recording surface of the disk.

The flying height and posture of the slider are expected to be substantially fixed without regard to the radial position of the magnetic disk. The rotational frequency of the disk is constant, while its peripheral speed varies depending on the radial position. Since the magnetic head is positioned by the rotary carriage assembly, moreover, a skew angle (angle between the direction of the flow and the center line of the slider) also varies depending on the radial position of the disk. In designing the slider, therefore, changes of the flying height and posture based on the radial position of the disk, e.g., the fluctuation of the pitch angle, must be suppressed by suitably utilizing the aforesaid two parameters that vary depending on the radial position of the disk. For example, the positive pressure generated in the slider varies between the inner and outer peripheral portions of the magnetic disk, so that the pitch angle of the slider fluctuates easily.

There is known a disk device in which a negative-pressure cavity is formed near the center of a facing surface of a slider in order to prevent such fluctuations of the flying height and posture (e.g., Jpn. Pat. Appln. KOKAI Publication No. 2001-283549). Proposed in Jpn. Pat. Appln. KOKAI Publication No. 2001-312811, moreover, is a recessed leading pad that is provided on a facing surface of a slider.

With the magnetic head of the disk devices described above, however, it is hard to fully reduce the pitch angle fluctuation between the inner and outer peripheral portions of the magnetic disk, and a fluctuation of tens of percent occurs. If the flying behavior of the magnetic head changes in this manner, recording and reproduction may possibly fail to be stabilized. Thus, the device lacks in reliability.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, there is provided a head comprising: a slider which has a facing surface opposed to a surface of a rotatable recording medium and is flown by an airflow which is generated between the recording medium surface and the facing surface as the recording medium rotates; and a head portion which is disposed on the slider and records and reproduces information to and from the recording medium, the facing surface of the slider having a first direction extending in a direction of the airflow and a second direction perpendicular to the first direction, the slider including a negative-pressure cavity which is defined by a recess formed in the facing surface and generates a negative pressure, a leading step portion which protrudes from the facing surface, is situated on an upstream side of the negative-pressure cavity with respect to the airflow, and faces the recording medium, a leading pad which protrudes from the leading step portion, a recess which is formed in that part of the leading step portion which is situated on the upstream side of the leading pad with respect to the airflow and defines a first step portion and a second step portion which individually extend in a direction across the first direction and are spaced in the first direction, a trailing step portion which protrudes from the facing surface, is situated on a downstream side of the negative-pressure cavity with respect to the airflow, and faces the recording medium, and a trailing pad which protrudes from the trailing step portion.

An embodiment in which a disk device according to this invention is applied to a hard disk drive (HDD) will now be described in detail with reference to the accompanying drawings.

Figure 1:
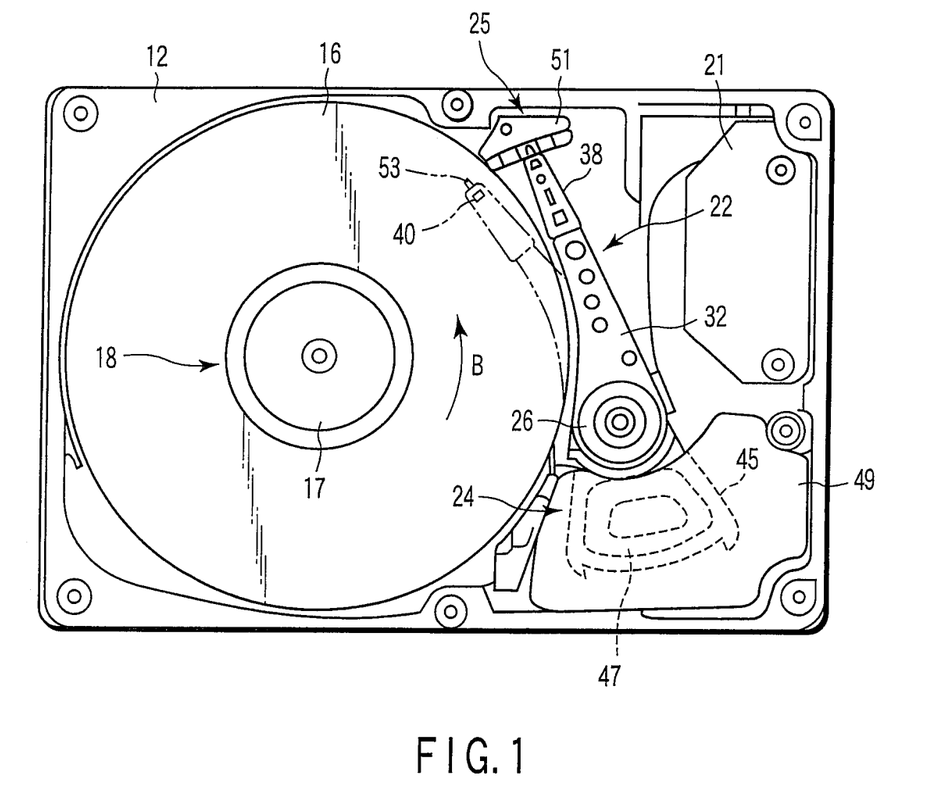
FIG. 1 is an exemplary plan view showing an HDD according to an embodiment of the invention.

As shown in FIG. 1, the HDD includes a case 12 in the form of an open-topped rectangular box and a top cover (not shown). The top cover is fastened to the case by screws so as to close the top opening of the case.

The case 12 contains a magnetic disk 16, spindle motor 18, magnetic heads 40, carriage assembly 22, voice coil motor (VCM) 24, ramp load mechanism 25, board unit 21, etc. The magnetic disk 16 serves as a recording medium. The spindle motor 18 serves as a drive section that supports and rotates the magnetic disk. The magnetic heads write and read information to and from the disk. The carriage assembly 22 supports the magnetic heads for movement with respect to the magnetic disk 16. The VCM 24 rocks and positions the carriage assembly. The ramp load mechanism 25 holds the magnetic heads in a retracted position at a distance from the magnetic disk when the heads are moved to the outermost periphery of the disk. The board unit 21 includes a head IC and the like.

A printed circuit board (not shown) for controlling the operations of the spindle motor 18, VCM 24, and magnetic heads through the board unit 21 is screwed to the outer surface of a bottom wall of the case 12.

The magnetic disk 16 has magnetic recording layers on its upper and lower surfaces, individually. The disk 16 is fitted on a hub (not shown) of the spindle motor 18 and fixed on the hub by a clamp spring 17. If the motor 18 is driven, the disk 16 is rotated at a predetermined speed of, for example, 4,200 rpm in the direction of arrow B.

The carriage assembly 22 is provided with a bearing portion 26, which is fixed on the bottom wall of the case 12, and arms 32 that extend from the bearing portion. The arms 32 are situated parallel to the surfaces of the magnetic disk 16 and spaced from one another. They extend in the same direction from the bearing portion 26. The carriage assembly 22 is provided with suspensions 38 that are elastically deformable elongate plates. Each suspension 38 is formed of a leaf spring, of which the proximal end is fixed to the distal end of its corresponding arm 32 by spot welding or adhesive bonding and which extends from the arm. Alternatively, each suspension may be formed integrally with its corresponding arm 32. The arm 32 and the suspension 38 constitute a head suspension, and the head suspension and the magnetic heads 40 constitute a head suspension assembly.

Figure 2:
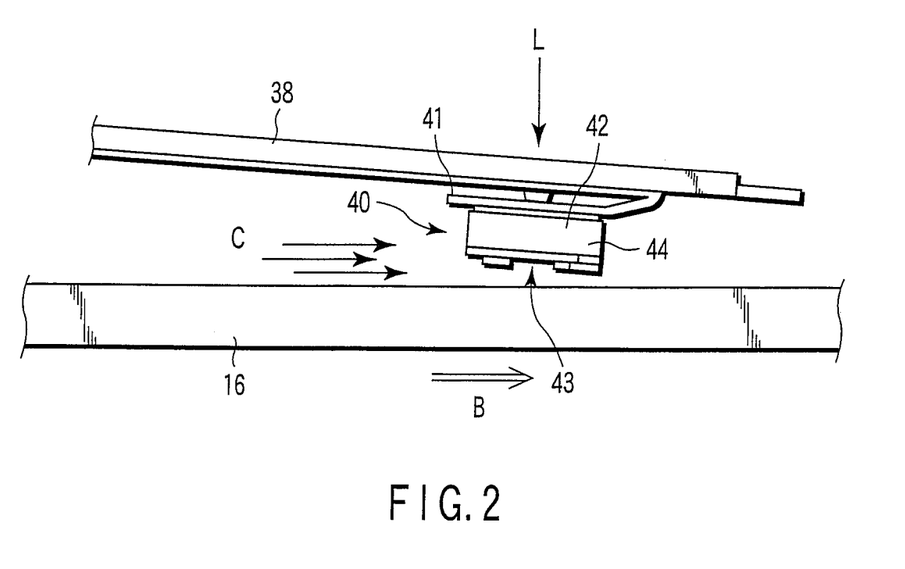
FIG. 2 is an exemplary enlarged side view showing a magnetic head portion of the HDD.

As shown in FIG. 2, each magnetic head 40 includes a slider 42 substantially in the shape of a rectangular parallelepiped and a recording/reproducing head portion 44 on the slider. It is fixed to a gimbals spring 41 that is provided on the distal end portion of each suspension 38. Each magnetic head 40 is subjected to a head load L directed to a surface of the magnetic disk 16 by the elasticity of the suspension 38.

As shown in FIG. 1, the carriage assembly 22 includes a support frame 45 that extends from the bearing portion 26 in the direction opposite from the arms 32. The support frame supports a voice coil 47 that constitutes a part of the VCM 24. The support frame 45 is molded from plastic and formed integrally on the outer periphery of the voice coil 47. The voice coil 47 is situated between a pair of yokes 49 that are fixed on the case 12 and, in conjunction with these yokes and a magnet (not shown) fixed to one of the yokes, constitutes the VCM 24. If the voice coil 47 is energized, the carriage assembly 22 rocks around the bearing portion 26, whereupon each magnetic head 40 is moved to and positioned in a region over a desired track of the magnetic disk 16.

The ramp load mechanism 25 includes a ramp 51 and tabs 53. The ramp 51 is provided on the bottom wall of the case 12 and located outside the magnetic disk 16. The tabs 53 extend individually from the respective distal ends of the suspensions 38. As the carriage assembly 22 rocks to its retracted position outside the magnetic disk 16, each tab 53 engages a ramp surface on the ramp 51 and is then pulled up along the slope of the ramp surface, whereupon each magnetic head is unloaded.

Figure 3:
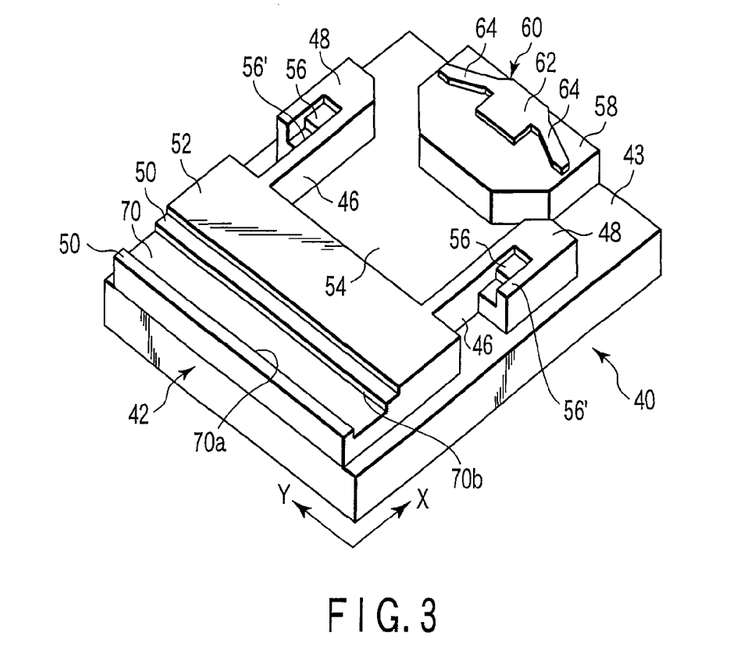
FIG. 3 is an exemplary perspective view showing the disk-facing surface side of a slider of the magnetic head.

The following is a detailed description of each magnetic head 40. FIG. 3 is a perspective view showing the slider of the magnetic head, FIG. 4 is a plan view of the slider, and FIG. 5 is a sectional view of the slider.

Figure 4:
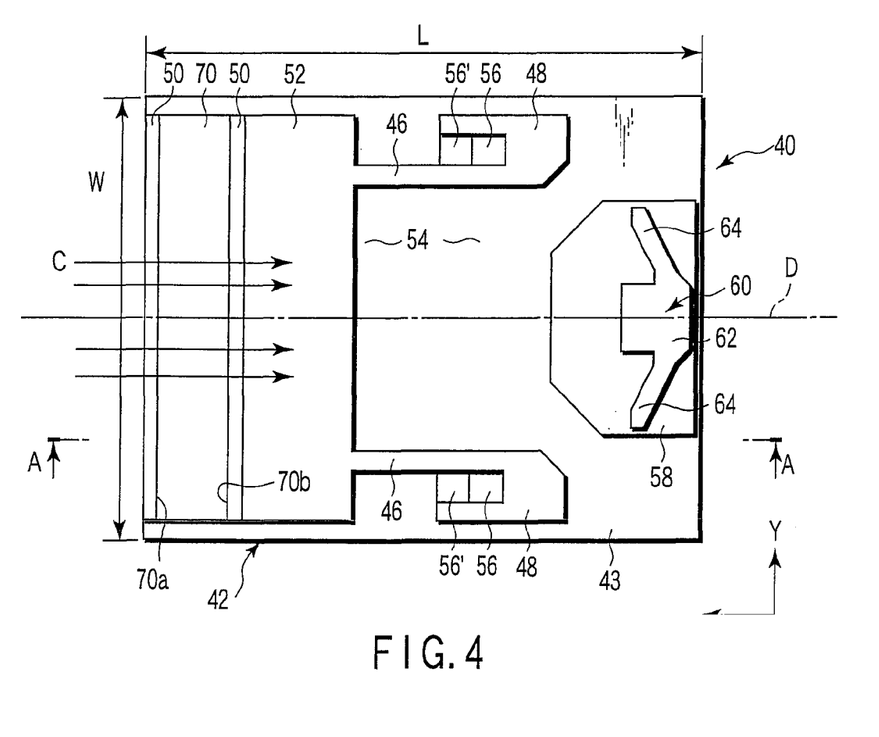
FIG. 4 is an exemplary plan view showing the disk-facing surface side of the slider.
Figure 5:
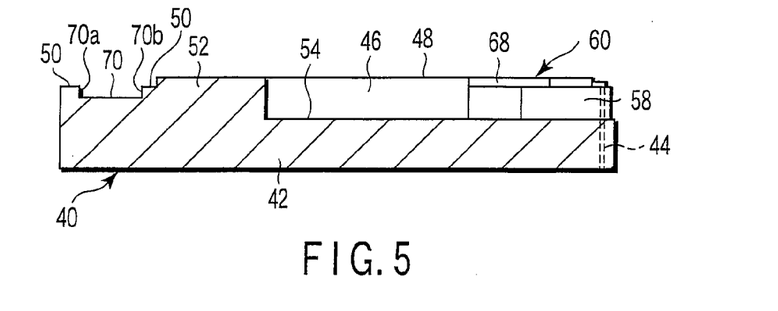
FIG. 5 is an exemplary sectional view taken along line V-V of FIG. 4.

As shown in FIGS. 3 to 5, the magnetic head 40 includes the slider 42 that is substantially in the shape of a rectangular parallelepiped. The slider 42 has a rectangular disk-facing surface (air bearing surface (ABS)) 43, which faces a surface of the magnetic disk 16. The longitudinal direction of the disk-facing surface 43 is supposed to be a first direction X, and the transverse direction perpendicular thereto to be a second direction Y. The disk-facing surface 43 has a central axis D that extends in the first direction X.

The slider 42 is formed as a so-called femto slider, having a length L of 1.25 mm or less, e.g., 0.85 mm, in the first direction X and a width W of 1.0 mm or less, e.g., 0.7 mm, in the second direction Y.

The magnetic head 40 is constructed as a flying head, in which the slider 42 is flown by an airflow C (see FIG. 2) that is generated between the disk surface and the disk-facing surface 43 as the magnetic disk 16 rotates. When the HDD is operating, the disk-facing surface 43 of the slider 42 never fails to be opposed to the disk surface with a gap therebetween. The direction of the airflow C is coincident with the rotation direction B of the magnetic disk 16. The slider 42 is located so that the first direction X of the disk-facing surface 43 opposed to the surface of the disk 16 is substantially coincident with the direction of the airflow C.

A substantially rectangular leading step portion 50 protrudes from the disk-facing surface 43 so as to face the magnetic disk surface. The leading step portion 50 is formed covering the upstream-side portion of the disk-facing surface 43 with respect to the direction of the airflow C. A pair of side portions 46 protrude from the disk-facing surface 43. They extend along the long sides of the surface 43 and are opposed to each other with a space between them. The side portions 46 extend from the leading step portion 50 toward the downstream end of the slider 42. The leading step portion 50 and the pair of side portions 46 are located symmetrically with respect to the central axis D of the slider 42. As a whole, they are formed substantially in the shape of a U, closed on the upstream side and open to the downstream side.

In order to maintain the pitch angle of the magnetic head 40, a leading pad 52 that utilizes an air film to support the slider 42 protrudes from the leading step portion 50. The leading pad 52 continuously extends throughout the area in the width direction of the leading step portion 50 in the second direction Y, and is formed in a position deviated on the downstream side from the inflow end of the slider 42.

A rectangular recess 70 is formed in that part of the leading step portion 50 which is situated on the upstream side of the leading pad 52 with respect to the airflow C. The recess 70 is formed shallower than a negative-pressure cavity 54 (mentioned later) and symmetrically with respect to the central axis D of the slider 42. In the present embodiment, the recess 70 has two sides that extend throughout the length of the leading step portion 50 along the second direction Y and opens on both side edges of the leading step portion. A first step portion 70a and a second step portion 70b are defined by the recess 70 in the leading step portion 50. The first and second step portions 70a and 70b individually extend in a direction (second direction Y in this case) across the first direction X and are spaced in the first direction. The first step portion 70a is situated on the upstream side of the second step portion 70b with respect to the airflow C and generates a negative pressure corresponding to the airflow. The second step portion 70b is situated on the downstream side of the first step portion 70a with respect to the airflow C and generates a positive pressure corresponding to the airflow.

A side pad 48 is formed on each side portion 46 and leads to the leading pad 52. The pads 52 and 48 are formed substantially flat and face the magnetic disk surface.

Recesses 56 and 56' are formed in each side pad 48. The recesses 56 and 56' open toward the inflow end of the disk-facing surface 43 as well as toward the magnetic disk surface. Each of the recesses 56 and 56' has a rectangular shape defined by a pair of side edges, which extend substantially parallel to the first direction X, and a bottom edge, which connects the respective extended ends of the side edges and extends substantially parallel to the second direction Y. The recess 56 has a depth (or height) which is the same as that of the leading step portion 50. The recess 56' has a depth (or height) which is the same as that of the recess 70 of the leading step portion 50.

As shown in FIGS. 3 and 4, the negative-pressure cavity 54 is formed substantially in the center of the disk-facing surface 43. It is a recess that is defined by the pair of side portions 46 and the leading step portion 50. The cavity 54 is formed on the downstream side of the leading step portion 50 with respect to the direction of the airflow C and opens toward the downstream side. The negative-pressure cavity 54 is deeper than the recess 70 in the leading step portion 50. It serves to produce a negative pressure on the central part of the disk-facing surface 43 at every feasible yaw angle for the HDD.

The slider 42 has a trailing step portion 58 that protrudes from the downstream end portion of the disk-facing surface 43 and faces the magnetic disk surface in the direction of the airflow C. The trailing step portion 58 is situated in the downstream side of the negative-pressure cavity 54 with respect to the direction of the airflow C and substantially in the center of the disk-facing surface 43 with respect to the second direction Y.

As shown in FIGS. 3 to 5, the trailing step portion 58 is substantially in the shape of a rectangular parallelepiped, of which two corner portions on the upstream side are chamfered. The height of projection (or depth) of the trailing step portion 58 is equal to that of the leading step portion 50 and that of the recess 56 of the side pad 48.

A trailing pad 60 that utilizes an air film to support the slider 42 protrudes from the trailing step portion 58. The trailing pad 60 is formed a little higher than the upper surface of the trailing step portion 58 and flush with the leading pad 52 and the side pads 48.

The trailing pad 60 includes a substantially rectangular base portion 62 and a pair of wing portions 64 that extend from the base portion to opposite sides along the second direction Y. On the trailing step portion 58, the base portion 62 is provided on the central axis D on the outflow end side and situated substantially in the center with respect to the second direction Y. Each wing portion 64 extends in the second direction Y from the base portion 62 and with a small inclination toward the upstream end of the slider 42.

As shown in FIG. 5, the head portion 44 of the magnetic head 40 includes a recording element and a reproducing element, which record and reproduce information to and from the magnetic disk 16. The reproducing and recording elements are embedded in the downstream end portion of the slider 42 with respect to the direction of the airflow C. The reproducing and recording elements have a read/write gap (not shown) that is defined in the trailing pad 60.

According to the HDD and the head suspension assembly constructed in this manner, the magnetic head 40 is flown by the airflow C that is generated between the disk surface and the disk-facing surface 43 as the magnetic disk 16 rotates. When the HDD is operating, therefore, the disk-facing surface 43 of the slider 42 never fails to be opposed to the disk surface with a gap therebetween. As shown in FIG. 2, the magnetic head 40 flies in an inclined posture such that the read/write gap of the head portion 44 is located closest to the disk surface.

According to the magnetic head 40 constructed in this manner, the recess 70 is formed in the leading step portion 50 of the slider 42, and it defines the first and second step portions 70a and 70b. Thus, even if the peripheral speed of the inner peripheral portion of the magnetic disk 16 is different from that of the inner peripheral portion, the fluctuation of the flying posture, especially that of the pitch angle, between the inner and outer peripheral portions of the magnetic disk can be suppressed. Thus, there may be obtained the magnetic head of improved stability and reliability, the head suspension assembly provided with the head, and the disk device.

Figure 6:
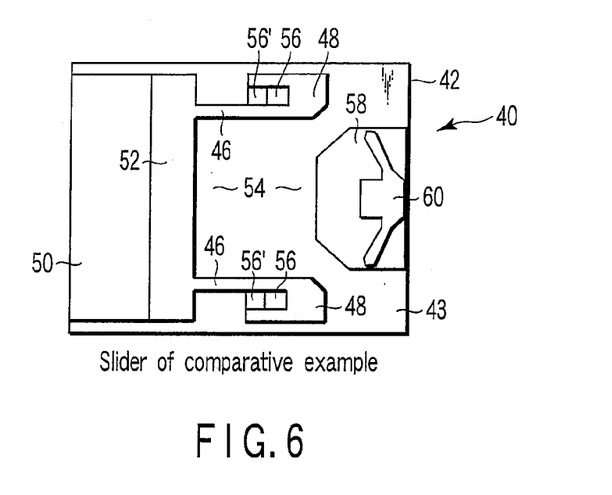
FIG. 6 is an exemplary plan view showing a slider of a magnetic head without a recess given as a comparative example.

The inventor hereof prepared the magnetic head according to the embodiment described above and a magnetic head according to a comparative example and simulated the flying pitch angles of the respective sliders of these magnetic heads from the inner periphery to the outer periphery of the magnetic disk. In the magnetic head according to the comparative example, as shown in FIG. 6, a leading step portion 50 of a slider 42 is a flat structure without the recess 70. Other configurations of this slider 42 are the same as those of the slider 42 according to the present embodiment.

Figure 7:
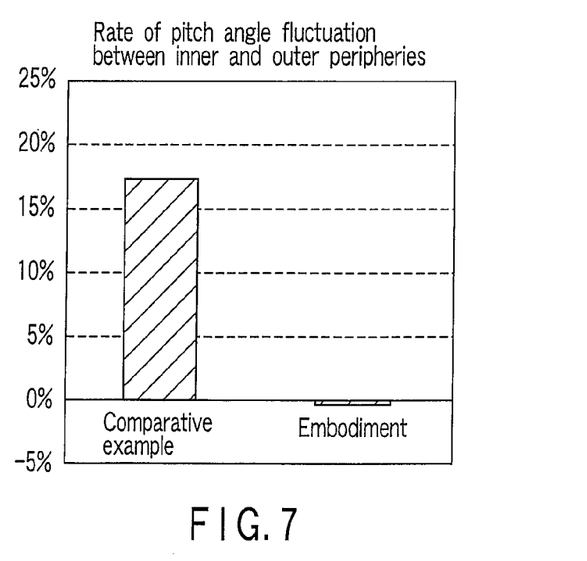
FIG. 7 is an exemplary diagram comparatively showing rates of pitch angle fluctuation with respect to the magnetic heads according to the present embodiment and the comparative example.

FIG. 7 shows the result of the simulation. In the magnetic head according to the comparative example, as shown in FIG. 7, the pitch angle of the slider varies by about 17% between the positions opposite the inner and outer peripheries of the disk. According to the magnetic head of the present embodiment, on the other hand, the fluctuation of the pitch angle from the inner periphery to the outer periphery of the magnetic disk appears to be approximately zero.

Figure 8:
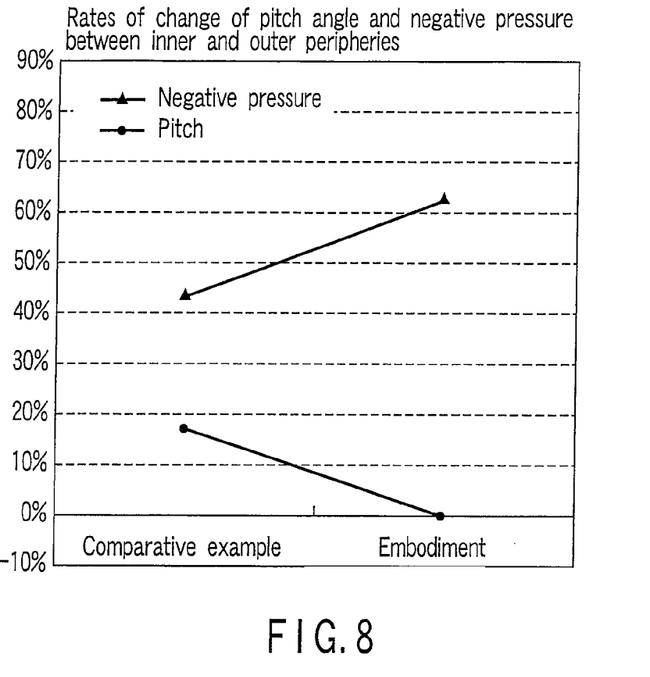
FIG. 8 is an exemplary diagram comparatively showing rates of pitch angle fluctuation and negative pressure change with respect to the magnetic heads according to the present embodiment and the comparative example.
Figure 9:
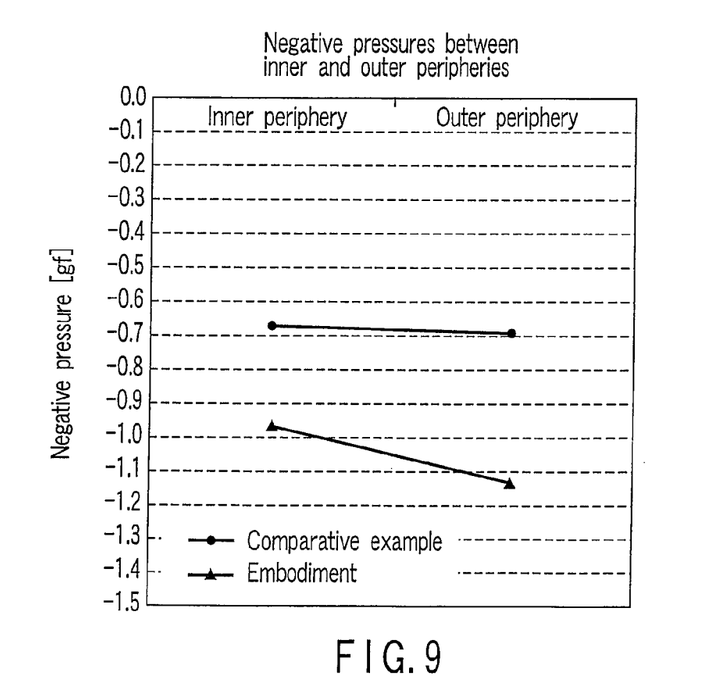
FIG. 9 is an exemplary diagram comparatively showing negative pressure variations between the inner and outer peripheral portions of a disk with respect to the magnetic heads according to the present embodiment and the comparative example.

As shown in FIGS. 8 and 9, the rate of negative pressure change of the slider of the magnetic head according to the comparative example, between the positions opposite the inner and outer peripheries of the disk, is 40% or thereabout, while that of the magnetic head according to the present embodiment is increased to about 60%. Thus, according to the magnetic head of the present embodiment, the negative pressure is found to be considerably increased in the position opposite the outer periphery of the magnetic disk.

Figures 10A, 10B:
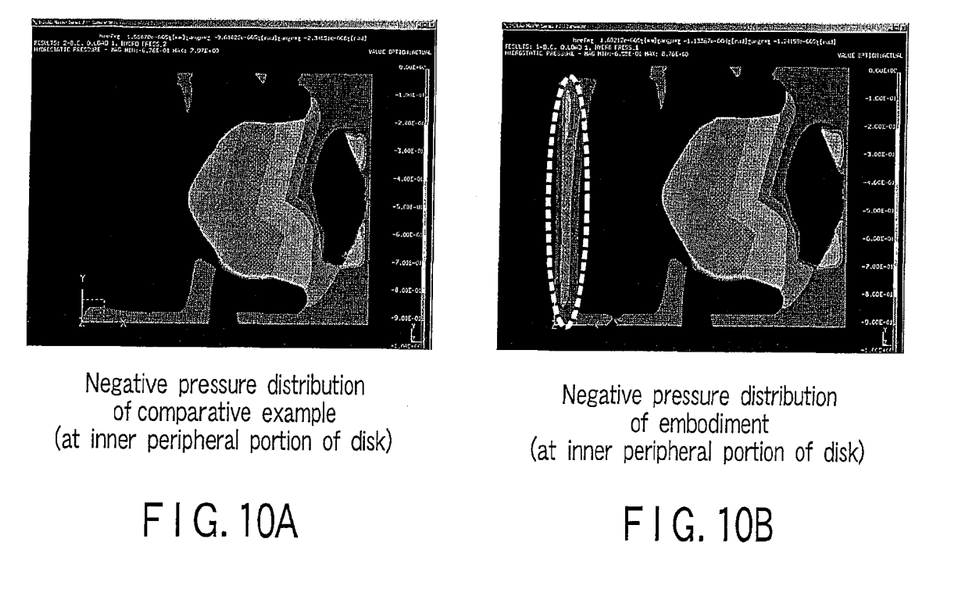
FIGS. 10A and 10B are exemplary diagrams individually showing negative pressure distributions at the inner peripheral portion of the disk with respect to the magnetic heads according to the present embodiment and the comparative example.
Figure 11A:
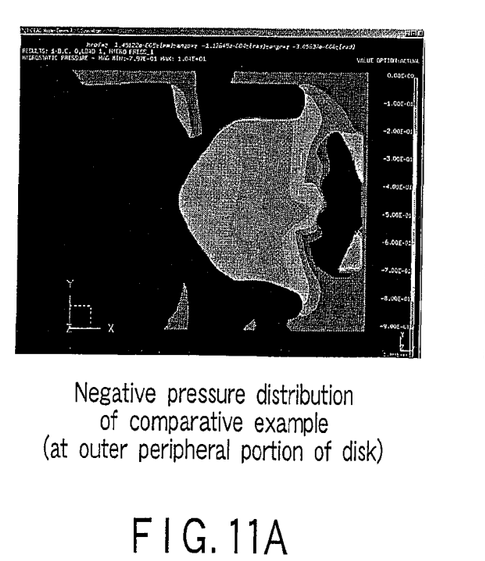
FIGS. 11A and 11B are exemplary diagrams individually showing negative pressure distributions at the outer peripheral portion of the disk with respect to the magnetic heads according to the present embodiment and the comparative example.
Figure 11B:
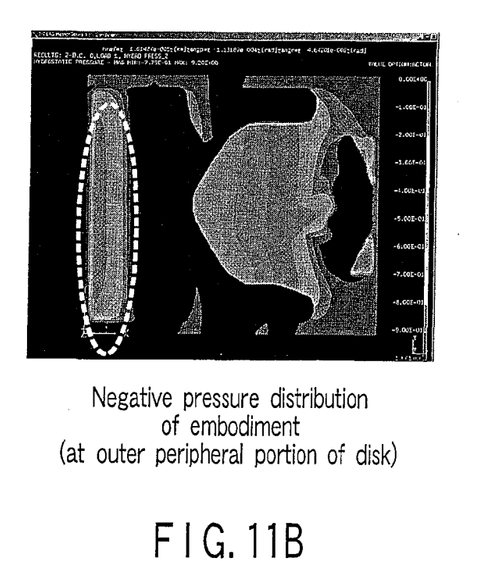

FIGS. 10A and 10B show negative-pressure distributions at the inner peripheral portion of the magnetic disk observed with use of the magnetic heads according to the comparative example and the present embodiment, respectively. FIGS. 11A and 11B show negative-pressure distributions at the outer peripheral portion of the disk observed with use of the magnetic heads according to the comparative example and the present embodiment, respectively.

According to the magnetic head of the present embodiment, as seen from these drawings, negative pressures are generated at both the inner and outer peripheral portions of the magnetic disk, corresponding in position to the recess 70 as well as to the negative-pressure cavity. The negative pressure that is generated in the magnetic head at the outer peripheral portion of the disk is much higher than the negative pressure generated at the inner peripheral portion. According to the magnetic head of the comparative example, on the other hand, no negative pressure is generated on the leading step side at either the inner or outer peripheral portion of the magnetic disk.

Figure 12A:
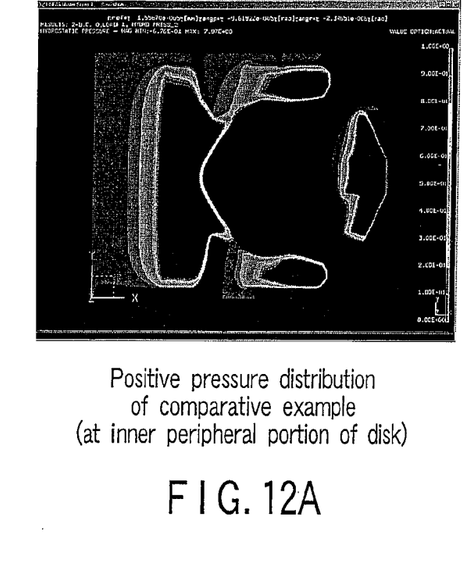
FIGS. 12A and 12B are exemplary diagrams individually showing positive pressure distributions at the inner peripheral portion of the disk with respect to the magnetic heads according to the present embodiment and the comparative example.
Figure 12B:
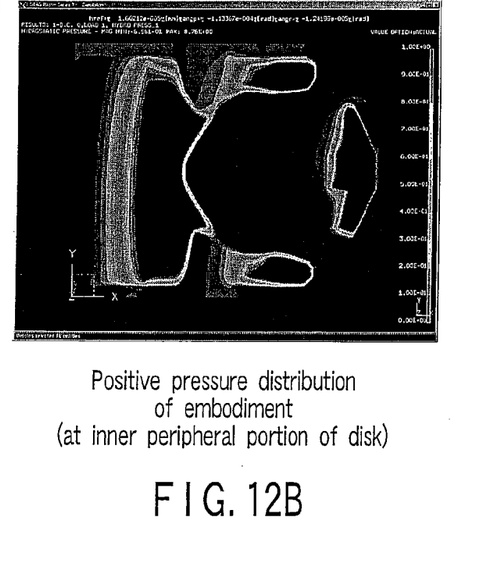
Figure 13A:
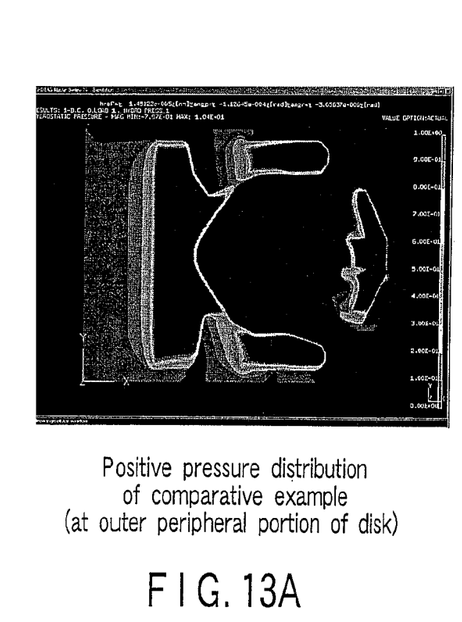
FIGS. 13A and 13B are exemplary diagrams individually showing positive pressure distributions at the outer peripheral portion of the disk with respect to the magnetic heads according to the present embodiment and the comparative example.
Figure 13B:
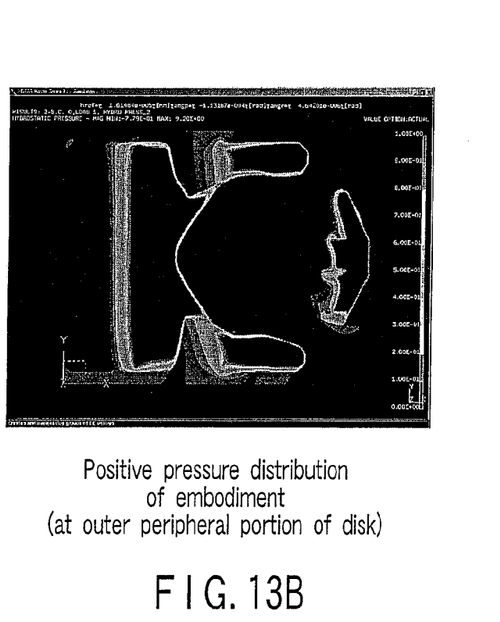

FIGS. 12A and 12B show positive-pressure distributions at the inner peripheral portion of the magnetic disk observed with use of the magnetic heads according to the comparative example and the present embodiment, respectively. FIGS. 13A and 13B show positive-pressure distributions on the outer peripheral portion of the disk observed with use of the magnetic heads according to the comparative example and the present embodiment, respectively.

As seen from these drawings, the magnetic head of the present embodiment with the recess 70 generates positive pressures that are substantially equal to ones generated by the magnetic head of the comparative example at both the inner and outer peripheral portions of the magnetic disk.

In general, the peripheral speed of the outer peripheral portion of a magnetic disk is higher than that of the inner peripheral portion, and the flying pitch angle of a magnetic head is larger at the inner peripheral portion of the disk than at the outer peripheral portion. In order to suppress an increase in the flying pitch angle of the head at the outer peripheral portion of the disk, it is necessary to generate a higher negative pressure at the outer peripheral portion of the disk than at the inner peripheral portion. According to the magnetic head of the present embodiment described above, a negative pressure can be generated by providing the leading step portion 50 with a deeper step (or recess) on the air inlet side of the leading step portion. Thus, the magnetic head according to the present embodiment is configured so that an increase in the flying height on the leading step side of the slider at the outer peripheral portion of the magnetic disk can be suppressed by generating a higher negative pressure at the outer peripheral portion (with a peripheral speed of 8 m/s) of the disk than at the inner peripheral portion (with a peripheral speed of 4 m/s). Thus, the magnetic head can reduce the fluctuation of the flying pitch angle of the slider that accompanies a change of position in the radial direction of the magnetic disk.

Further, the inventor hereof prepared a plurality of magnetic heads having recesses 70 in their respective leading step portions, the recesses being different in size and number. As shown in FIGS. 14A, 14B, 14C, 14D and 14E, for example, magnetic heads A, B, C, D and E of five different types were prepared and compared in their rates of pitch angle fluctuation and negative pressure change between the inner and outer peripheral portions of the magnetic disk, based on the depth of each recess 70 as a parameter.

Figure 14A:
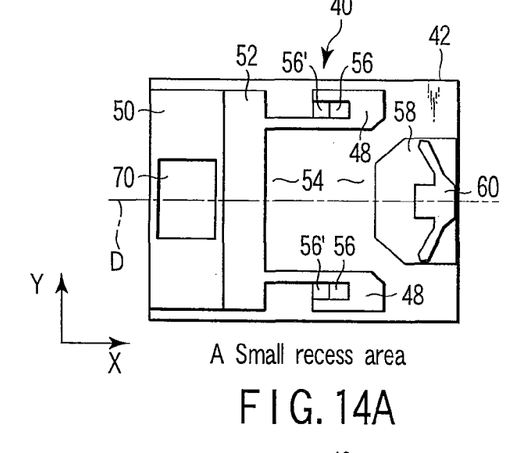
FIGS. 14A, 14B, 14C, 14D and 14E are exemplary plan views individually showing magnetic head sliders of five types that are different in the shape and number of recesses in a leading step portion.
Figure 14B:
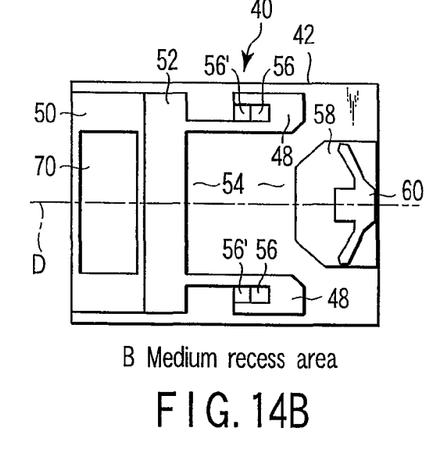

The magnetic heads A and B each have a rectangular recess 70 formed in the leading step portion 50. The recess 70 has an area smaller than that of the leading step portion 50. Each side of the recess extends in the first or second direction. The individual sides of the recess 70 form first and second step portions that individually extend in the second direction Y and two other step portions that individually extend in the first direction X. Further, each recess 70 is formed symmetrically with respect to the central axis D of the slider 42. The recess 70 of the magnetic head B is longer in the second direction Y than the recess of the magnetic head A.

Figure 14C:
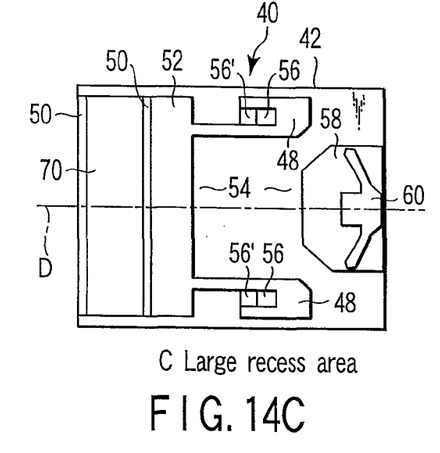

The magnetic head C is constructed in the same manner as the magnetic head according to the foregoing embodiment, and its recess 70 is formed throughout the length of the leading step portion 50 in the second direction Y.

Figure 14D:
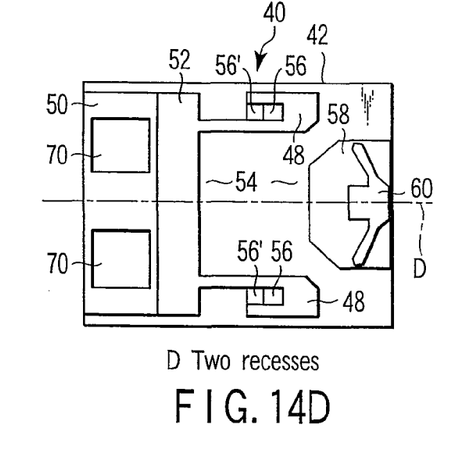
Figure 14E:
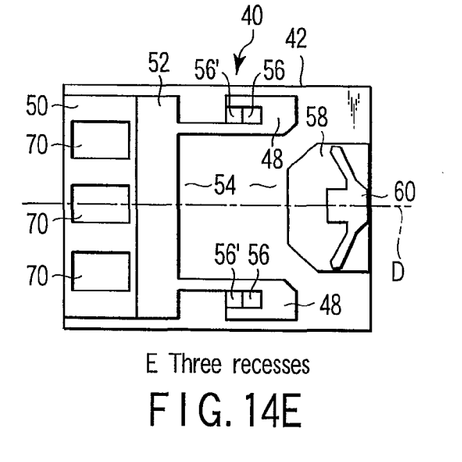

The magnetic head D has two rectangular recesses 70 individually formed in the leading step portion 50, while the magnetic head E has three rectangular recesses 70 formed in the leading step portion 50. Each recess 70 has an area smaller than that of the leading step portion 50. Each side of the recess extends in the first or second direction. The sides of the recess 70 form first and second step portions that individually extend in the second direction Y and two other step portions that individually extend in the first direction X. Further, the two recesses 70 of the magnetic head D are located symmetrically with respect to the central axis D of the slider 42. Likewise, the three recesses 70 of the magnetic head E are located symmetrically with respect to the central axis D of the slider 42.

Other configurations of the magnetic heads A, B, C, D and E of five different types than the recess 70 are the same as those of the magnetic head according to the foregoing embodiment.

Figure 15:
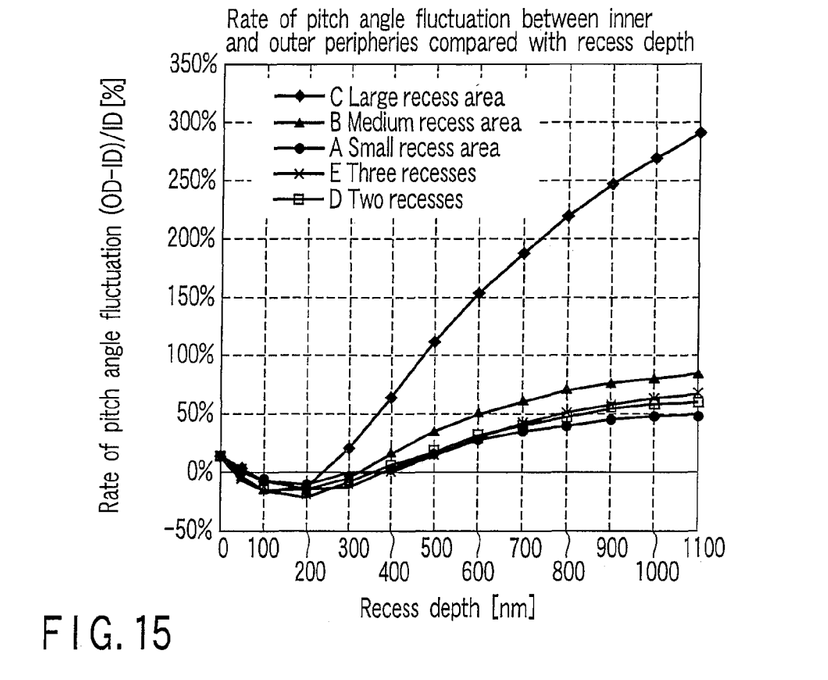
FIG. 15 is an exemplary diagram showing rates of pitch angle fluctuation between the inner and outer peripheral portions of the disk with respect to the magnetic head sliders of the five types, based on the depth of each recess as a parameter.

As seen from FIG. 15, the pitch angle fluctuation of any of the magnetic heads between the inner and outer peripheral portions of the magnetic disk can be suppressed by providing the recesses 70 with depths of about 100 to 300 nm without regard to the area, shape, and number of the recesses. In the case of the recesses 70 with the depths of about 100 to 300 nm, as seen from FIG. 16, moreover, the rate of negative pressure change of any of the magnetic heads is high, and the variation of the negative pressure is larger at the outer peripheral portion of the magnetic disk than at the inner peripheral portion.

Figure 16:
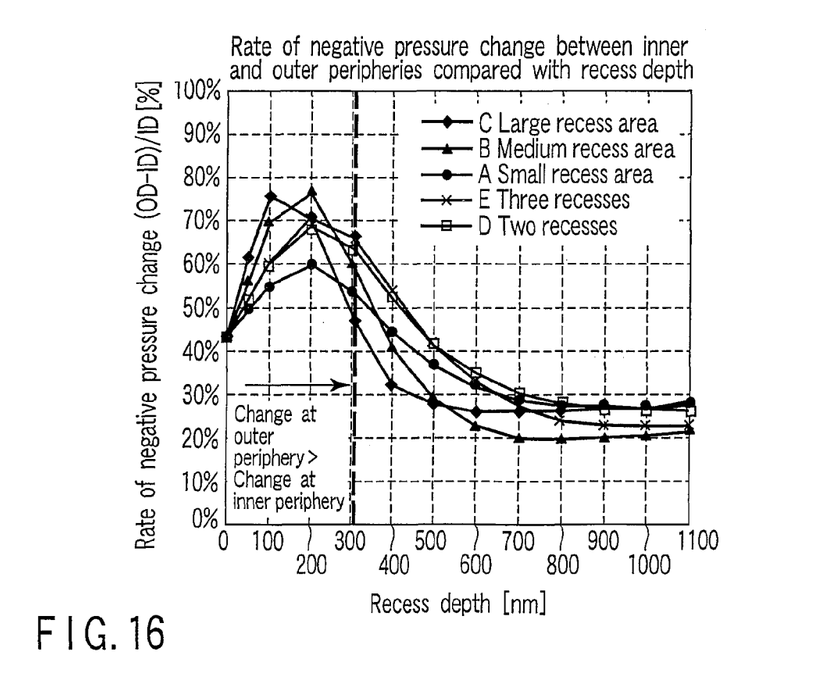
FIG. 16 is an exemplary diagram showing rates of negative pressure change between the inner and outer peripheral portions of the disk with respect to the magnetic head sliders of the five types, based on the depth of each recess as a parameter.

In FIG. 15, symbols OD and ID designate pitch angles of the slider at the outer and inner peripheral portions of the magnetic disk, respectively. In FIG. 16, symbols OD and ID designate negative pressures generated by the slider at the outer and inner peripheral portions of the magnetic disk, respectively.

Thus, according to the magnetic head of the present embodiment and the head suspension assembly and the HDD provided with the same, the fluctuation of the flying pitch angle that accompanies the change of position in the radial direction of the disk can be reduced without failing to maintain the degree of freedom of design of the leading pad and the flying pitch angle. Thus, there may be obtained the magnetic head of improved stability and reliability with its flying posture fluctuation suppressed, the head suspension assembly provided with the head, and the disk device.

While certain embodiments of the invention have been described, these embodiments have been presented by way of example only, and are not intended to limit the scope of the invention. Indeed, the novel methods and systems described herein may be embodied in a variety of forms. Furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

The shapes, dimensions, etc. of the leading step portion, trailing step portion, and pads of the slider are not limited to the embodiment described herein but may be varied as required. Each recess formed in the leading step portion is only expected to be shaped to define a step portion extending across the first direction of the slider, and may be formed in any other shape than the rectangular one, e.g., a circular or elliptic shape. The number of recesses is not limited to one, two, or three, but may be increased as required.

This invention is not limited to femto sliders but may be also applied to pico sliders, pemto sliders, or any other larger sliders.

What is claimed is:

1. A head comprising:
   a slider which has a facing surface opposed to a surface of a rotatable recording medium and is flown by an airflow which is generated between the recording medium surface and the facing surface as the recording medium rotates; and
   a head portion on the slider and records, configured to record and reproduce information to and from the recording medium,
   the facing surface of the slider having a first direction extending in a direction of the airflow and a second direction perpendicular to the first direction,
   the slider comprising:
       a negative-pressure cavity which is defined by a recess formed in the facing surface and generates a negative pressure,
       a leading step portion which protrudes from the facing surface, is situated on an upstream side of the negative-pressure cavity with respect to the airflow, and faces the recording medium,
       a leading pad which protrudes from the leading step portion,
       a recess which is formed in that part of the leading step portion which is situated on the upstream side of the leading pad with respect to the airflow and defines a first step portion and a second step portion which individually extend in a direction across the first direction and are spaced in the first direction, the recess having an area smaller than that of the leading step portion and defining another step portion extending in the first direction,
       a trailing step portion which protrudes from the facing surface, is situated on a downstream side of the negative-pressure cavity with respect to the airflow, and faces the recording medium, and
       a trailing pad which protrudes from the trailing step portion.

2. The head according to claim 1, wherein the first and second step portions extend in the second direction.

3. The head according to claim 1, wherein the recess is formed in a rectangular shape having sides individually extending along the first and second directions.

4. The head according to claim 1, wherein the recess is formed symmetrically with respect to a central axis of the facing surface which extends in the first direction.

5. The head according to claim 1, wherein the slider includes a pair of side portions which individually extend from the leading step portion toward a downstream end of the slider and protrude from the facing surface so as to surround the negative-pressure cavity.

6. A head comprising:
   a slider which has a facing surface opposed to a surface of a rotatable recording medium and is flown by an airflow which is generated between the recording medium surface and the facing surface as the recording medium rotates; and
   a head portion on the slider, configured to record and reproduce information to and from the recording medium,
   the facing surface of the slider having a first direction extending in a direction of the airflow and a second direction perpendicular to the first direction,
   the slider comprising:
       a negative-pressure cavity which is defined by a recess formed in the facing surface and generates a negative pressure,
       a leading step portion which protrudes from the facing surface, is situated on an upstream side of the negative-pressure cavity with respect to the airflow, and faces the recording medium,
       a leading pad which protrudes from the leading step portion,
       a plurality of recesses which are formed in that part of the leading step portion which is situated on the upstream side of the leading pad with respect to the airflow and each define a first step portion and a second step portion which individually extend in a direction across the first direction and are spaced in the first direction,
       a trailing step portion which protrudes from the facing surface, is situated on a downstream side of the negative-pressure cavity with respect to the airflow, and faces the recording medium, and
       a trailing pad which protrudes from the trailing step portion.

7. The head according to claim 6, wherein the plurality of recesses are provided symmetrically with respect to a central axis of the facing surface which extends in the first direction.

8. A head suspension assembly used in a disk device which includes a disk-shaped recording medium and a drive section which supports and rotates the recording medium, the head suspension assembly comprising:
   a head comprising a slider which has a facing surface opposed to a surface of the recording medium and is flown by an airflow which is generated between the recording medium surface and the facing surface as the recording medium rotates and a head portion on the slider, configured to record and reproduce information to and from the recording medium; and a head suspension which supports the head for movement with respect to the recording medium and applies a head load directed to the surface of the recording medium to the head, the facing surface of the slider having a first direction extending in a direction of the airflow and a second direction perpendicular to the first direction, the slider comprising:

a negative-pressure cavity which is defined by a recess formed in the facing surface and generates a negative pressure, a leading step portion which protrudes from the facing surface, is situated on an upstream side of the negative-pressure cavity with respect to the airflow, and faces the recording medium, a leading pad which protrudes from the leading step portion, a recess which is formed in that part of the leading step portion which is situated on the upstream side of the leading pad with respect to the airflow and defines a first step portion and a second step portion which individually extend in a direction across the first direction and are spaced in the first direction, the recess having an area smaller than that of the leading step portion and defining another step portion extending in the first direction, a trailing step portion which protrudes from the facing surface, is situated on a downstream side of the negative-pressure cavity with respect to the airflow, and faces the recording medium, and a trailing pad which protrudes from the trailing step portion.

9. A disk device comprising:

a disk-shaped recording medium;

a drive section which supports and rotates the recording medium;

a head comprising a slider which has a facing surface opposed to a surface of the recording medium and is flown by an airflow which is generated between the recording medium surface and the facing surface as the recording medium rotates and a head portion on the slider, configured to record and reproduce information to and from the recording medium; and a head suspension which supports the head for movement with respect to the recording medium and applies a head load directed to the surface of the recording medium to the head, the facing surface of the slider having a first direction extending in a direction of the airflow and a second direction perpendicular to the first direction, the slider comprising:

a negative-pressure cavity which is defined by a recess formed in the facing surface and generates a negative pressure, a leading step portion which protrudes from the facing surface, is situated on an upstream side of the negative-pressure cavity with respect to the airflow, and faces the recording medium, a leading pad which protrudes from the leading step portion, a recess which is formed in that part of the leading step portion which is situated on the upstream side of the leading pad with respect to the airflow and defines a first step portion and a second step portion which individually extend in a direction across the first direction and are spaced in the first direction, the recess having an area smaller than that of the leading step portion and defining another step portion extending in the first direction, a trailing step portion which protrudes from the facing surface, is situated on a downstream side of the negative-pressure cavity with respect to the airflow, and faces the recording medium, and a trailing pad which protrudes from the trailing step portion.

* * * * *